(12) United States Patent
Suzuki et al.

(10) Patent No.: US 12,736,140 B2
(45) Date of Patent: Sep. 15, 2026

(54) HOT WATER AND COLD WATER MIXING APPARATUS

(71) Applicant: TOTO LTD., Fukuoka (JP)

(72) Inventors: Hajime Suzuki, Fukuoka (JP); Hideyuki Matsui, Fukuoka (JP); Naoki Amamoto, Fukuoka (JP); Shota Watanabe, Fukuoka (JP); Fumihiro Suetsugu, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 18/886,157

(22) Filed: Sep. 16, 2024

(65) Prior Publication Data

US 2025/0180127 A1 Jun. 5, 2025

(30) Foreign Application Priority Data

Nov. 30, 2023 (JP) ................................ 2023-202752

(51) Int. Cl.
*F16K 11/02* (2006.01)
*F16K 11/20* (2006.01)
*F16K 11/00* (2006.01)

(52) U.S. Cl.
CPC ............ *F16K 11/02* (2013.01); *F16K 11/207* (2013.01); *F16K 19/006* (2013.01)

(58) Field of Classification Search
CPC ........ F16K 11/02; F16K 11/22; F16K 11/207; F16K 19/006
See application file for complete search history.

(56) References Cited

U.S. PATENT DOCUMENTS 5,025,983 A * 6/1991 Akita ...................... F16K 19/00 236/12.2
8,353,462 B2 * 1/2013 Todaka ................. F16K 31/003 236/102

FOREIGN PATENT DOCUMENTS

| | | | |
|---|---|---|---|
| CN | 210196550 U | | 3/2020 |
| JP | H08-312814 A | | 11/1996 |
| JP | H11-051219 A | | 2/1999 |
| JP | 2000-002360 A | | 1/2000 |
| JP | 2011064301 A | * | 3/2011 |
| JP | 2011-112209 A | | 6/2011 |
| JP | 2017-223312 A | | 12/2017 |

(Continued)

OTHER PUBLICATIONS

JP2011064301A machine translation (Year: 2011).*
The Japanese Office Action dated Oct. 29, 2025 (English Translation).

*Primary Examiner* — Michael R Reid
(74) *Attorney, Agent, or Firm* — BakerHostetler

(57) ABSTRACT

A hot water and cold water mixing apparatus includes: a valve body configured to adjust introduction amounts of cold water and hot water by moving in an axial direction; a valve case covering an outer side of the valve body; and an annular partition member arranged between an outer surface of the valve body and an inner surface of the valve case and configured to divide a gap therebetween into a cold water gap and a hot water gap. A groove portion is provided on the inner surface of the valve case. The annular partition member comes into close contact with a side wall of the groove portion and with the outer surface of the valve body and does not come into close contact with the inner surface of the valve case, under a state in which there is a differential pressure between the cold and hot water gaps.

6 Claims, 5 Drawing Sheets

(56) References Cited

FOREIGN PATENT DOCUMENTS

| | | | |
|---|---|---|---|
| JP | 6591934 | B2 | 9/2019 |
| WO | 91/05969 | A1 | 5/1991 |

* cited by examiner 100
1
2
3
4
5
10
20
30
40
50

34
10
31
50
40
20
30
33
32
4s 10
20
30
40
45
50
51
52
AC
RC
G

HOT WATER AND COLD WATER MIXING APPARATUS

CROSS-REFERENCE TO RELATED APPLICATION

This application claims the benefit of priority to Japanese Patent Application No. 2023-202752, filed on Nov. 30, 2023, which is incorporated by reference herein in its entirety.

BACKGROUND OF THE INVENTION

Field of the Invention

The present invention pertains to a hot water and cold water mixing apparatus.

Background Art

There has been known a hot water and cold water mixing apparatus including: a cold water channel into which cold water is supplied from a cold water supply source; a hot water channel into which hot water is supplied from a hot water supply source; a tubular valve body arranged movably in an axial direction thereof, the valve body being configured to adjust an introduction amount of the cold water from the cold water channel and an introduction amount of the hot water from the hot water channel by moving in the axial direction thereof.

With reference to FIG. 5, an outer side of a valve body 130 is covered by a valve case 140, and a groove portion 145 for receiving an O-ring 150 is provided on an inner surface of the valve case 140. The O-ring 150 is elastically deformable and received in the groove portion 145. The O-ring 150 divides a gap between the outer side of the valve body 130 and the inner surface of the valve case 140 into a cold water gap 151 communicating with a cold water channel and a hot water gap 152 communicating with a hot water channel.

Herein, as shown in FIG. 6, the O-ring 150 is configured to come into close contact with a side wall of the groove portion 145 and with both the outer surface of the valve body 130 and the inner surface of the valve case 140, under a state in which there is a differential pressure between the cold water gap 151 and the hot water gap 152.

Thereby, communication between the cold water gap 151 and the hot water gap 152 is surely shut off (see JP 6,591,934 B). JP 6,591,934 B is cited as a prior art document.

SUMMARY OF INVENTION

Technical Problem

However, the state of the O-ring 150 as shown in FIG. 6 is sufficiently effective for the purpose of shutting off communication, but has a disadvantage of a higher sliding resistance when the valve body 130 is slid against the valve case 140 for a temperature adjustment operation.

The present invention has been made under the above background. The object of the present invention is to provide a hot water and cold water mixing apparatus for achieving reduction of a sliding resistance when a valve body is slid against a valve case while maintaining performance capable of shutting off communication between a cold water gap and a hot water gap between the valve body and the valve case.

Solution to Problem

An aspect of the present invention is a hot water and cold water mixing apparatus including: a cold water channel into which cold water is supplied from a cold water supply source; a hot water channel into which hot water is supplied from a hot water supply source; a tubular valve body arranged movably in an axial direction thereof, the valve body being configured to adjust an introduction amount of the cold water from the cold water channel and an introduction amount of the hot water from the hot water channel by moving in the axial direction thereof; a valve case covering an outer side of the valve body; and an annular hot water and cold water partition member arranged between an outer surface of the valve body and an inner surface of the valve case, the annular hot water and cold water partition member being configured to divide a gap therebetween into a cold water gap communicating with the cold water channel and a hot water gap communicating with the hot water channel; wherein a groove portion for receiving the annular hot water and cold water partition member is provided on at least one of the outer surface of the valve body and the inner surface of the valve case, and the annular hot water and cold water partition member is configured to come into close contact with a side wall of the groove portion and with only one of the outer surface of the valve body and the inner surface of the valve case and not to come into close contact with another of the outer surface of the valve body and the inner surface of the valve case, under a state in which there is a differential pressure between the cold water gap and the hot water gap.

According to the above aspect, under the state in which there is a differential pressure between the cold water gap and the hot water gap, the annular hot water and cold water partition member comes into close contact with the side wall of the groove portion and with the only one of the outer surface of the valve body and the inner surface of the valve case, and thus performance capable of shutting off communication between the cold water gap and the hot water gap is maintained. On the other hand, the annular hot water and cold water partition member does not come into close contact with the other of the outer surface of the valve body and the inner surface of the valve case, and thus a sliding resistance when the valve body is slid against the valve case can be reduced. Herein, at least at filing of the present application, the annular hot water and cold water partition member may come into so light contact with the other of the outer surface of the valve body and the inner surface of the valve case that a sliding resistance is not caused.

It is preferable that the annular hot water and cold water partition member is configured to be away from the other of the outer surface of the valve body and the inner surface of the valve case, under the state in which there is a differential pressure between the cold water gap and the hot water gap.

According to this feature, the sliding resistance when the valve body is slid against the valve case can be reduced more clearly and more surely.

In addition, it is preferable that the groove portion is provided on only the other of the outer surface of the valve body and the inner surface of the valve case, and that the annular hot water and cold water partition member is configured to come into close contact with the only one of the outer surface of the valve body and the inner surface of the valve case, wherein the groove portion is not provided on the only one, and not to come into close contact with the other of the outer surface of the valve body and the inner surface of the valve case, wherein the groove portion is provided on the other, under the state in which there is a differential pressure between the cold water gap and the hot water gap.

The manner in which the groove portion is provided on only the other of the outer surface of the valve body and the inner surface of the valve case can save the cost of forming the groove portion and can improve the assembling performance because it does not require alignment of groove portions as another manner in which groove portions are provided on both of them.

In this case, it is more preferable that the groove portion is provided only on the inner surface of the valve case, and that the annular hot water and cold water partition member is configured to come into close contact with only the outer surface of the valve body and not to come into close contact with the inner surface of the valve case, under the state in which there is a differential pressure between the cold water gap and the hot water gap.

According to the inventors' findings, when the above feature is adopted, the annular hot water and cold water partition member (which is usually made of an elastic member or elastomeric member (such as an O-ring)) is fitted in a state extended from an original diameter thereof, and thus comes into close contact with the outer surface of the valve body due to an elastic forth of its own. On the contrary, when the annular hot water and cold water partition member comes into close contact with the inner surface of the valve case, it must be inserted in a state contracted from the original diameter thereof. In this way, the annular hot water and cold water partition member is likely to contract in a distorted manner, and thus is not likely to come into close contact fully circumferentially, which means lower (less) performance of shutting off the communication.

Furthermore, it is preferable that the groove portion has an axial direction clearance in the axial direction under an open atmospheric state in which the annular hot water and cold water partition member is received therein and a shutoff valve is closed (under a state in which there is no differential pressure between the cold water gap and the hot water gap), and that the axial direction clearance is smaller than a moving stroke of the valve body.

In the manner in which there is the axial direction clearance, when the annular hot water and cold water partition member is subjected to a differential pressure, the annular hot water and cold water partition member can move sufficiently rapidly so that the performance of shutting off the communication can be served rapidly. On the other hand, when the axial direction clearance is too large (not smaller than the moving stroke of the valve body), the state in which the annular hot water and cold water partition member is not in close contact with either side wall of the groove portion lasts too long, which makes it difficult to serve the performance of shutting off the communication effectively.

Furthermore, it is preferable that the groove portion has a radial direction clearance in a direction perpendicular to the axial direction under the open atmospheric state in which the annular hot water and cold water partition member is received therein and the shutoff valve is closed (under the state in which there is no differential pressure between the cold water gap and the hot water gap), and that the radial direction clearance is smaller than the axial direction clearance.

In the manner in which there is the radial direction clearance, when the annular hot water and cold water partition member is subjected to a differential pressure, the annular hot water and cold water partition member can move and/or deform sufficiently rapidly so that the performance of shutting off the communication can be served rapidly. On the other hand, when the radial direction clearance is too large (not smaller than the axial direction clearance), the differential pressure between both axial surfaces of the annular hot water and cold water partition member leaks out through the radial direction clearance, which disables the annular hot water and cold water partition member to be subjected to the differential pressure effectively.

Furthermore, it is preferable that the axial direction clearance is smaller than a radial direction gap between the outer surface of the valve body and the inner surface of the valve case on an outside of the groove portion.

According to the above size of the axial direction clearance, the annular hot water and cold water partition member can be subjected to a differential pressure sufficiently rapidly so that the performance of shutting off the communication can be served effectively.

In addition, it is preferable that the radial direction gap is smaller than the moving stroke of the valve body.

According to this feature, an amount of cold water which can pass through the cold water gap is likely to be smaller than an amount of cold water which flows into the valve body from the cold water channel, and an amount of hot water which can pass through the hot water gap is likely to be smaller than an amount of hot water which flows into the valve body from the hot water channel. Therefore, even if the performance of shutting off the communication by means of the annular hot water and cold water partition member is lost due to any reason, the degree to which a temperature adjustment function is obstructed by the cold water which passes through the cold water gap and/or by the hot water which passes through the hot water gap is reduced.

Advantageous Effects of Invention

According to the above aspect of the present invention, under the state in which there is a differential pressure between the cold water gap and the hot water gap, the annular hot water and cold water partition member comes into close contact with the side wall of the groove portion and with the only one of the outer surface of the valve body and the inner surface of the valve case, and thus the performance capable of shutting off the communication between the cold water gap and the hot water gap is maintained. On the other hand, the annular hot water and cold water partition member does not come into close contact with the other of the outer surface of the valve body and the inner surface of the valve case, and thus the sliding resistance when the valve body is slid against the valve case can be reduced.

DETAILED DESCRIPTION OF THE INVENTION (Structure)

Figure 1:
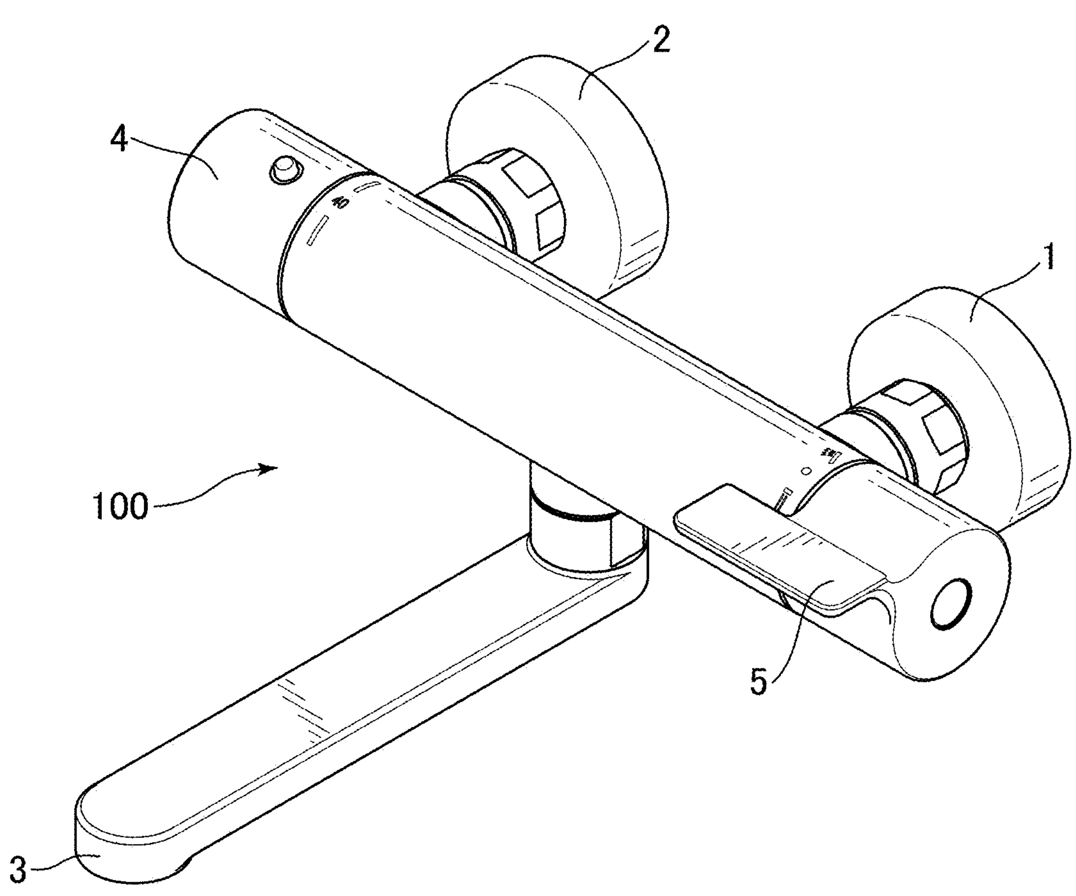
FIG. 1 is a schematic perspective view showing a hot water and cold water mixing apparatus according to an embodiment of the present invention.

With reference to the attached drawings, a hot water and cold water mixing apparatus according to an embodiment of the present invention is explained. FIG. 1 is a schematic perspective view showing a hot water and cold water mixing apparatus 100 according to an embodiment of the present invention.

As shown in FIG. 1, the hot water and cold water mixing apparatus 100 is connected to a cold water tap 1 (an example of a cold water supply source) and a hot water tap 2 (an example of a hot water supply source), which are provided on a wall of, for example, a bathroom. The hot water and cold water mixing apparatus 100 is provided with a water discharge port 3 at a central position thereof, a temperature adjustment handle 4 on a left side thereof, and a flow rate adjustment handle 5 on a right side thereof. In addition, although not shown, the hot water and cold water mixing apparatus 100 is also connected to a shower head.

A user can rotate the temperature adjustment handle 4 in order to adjust a temperature of water to be discharged as desired. The user can also rotate the flow rate adjustment handle 5 in order to adjust an amount of water to be discharged as desired. The user can also switch between the shower head and the water discharge port 3 ("Karan") as desired.

Figure 2:
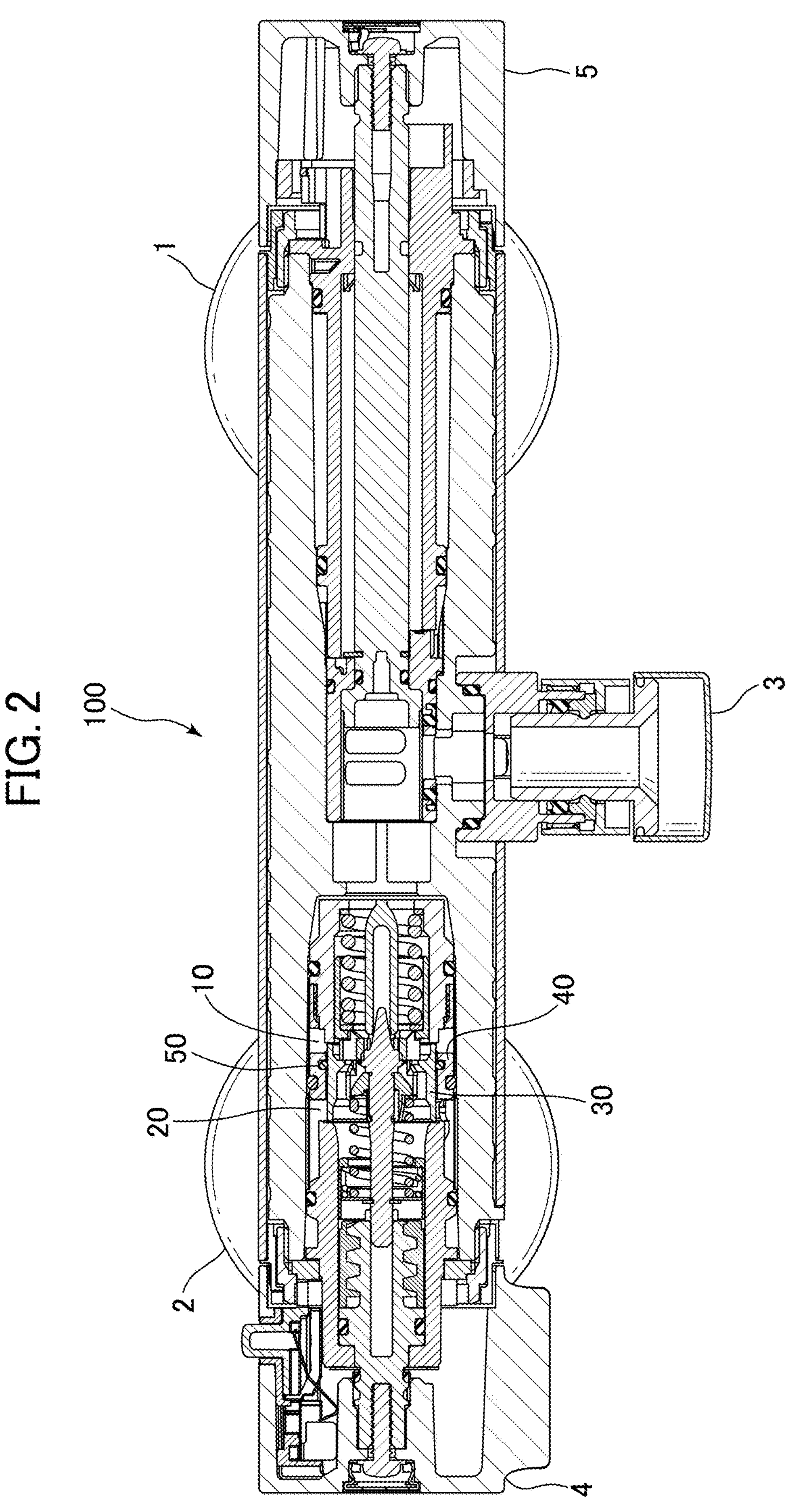
FIG. 2 is a sectional view showing the hot water and cold water mixing apparatus of FIG. 1.
Figure 3:
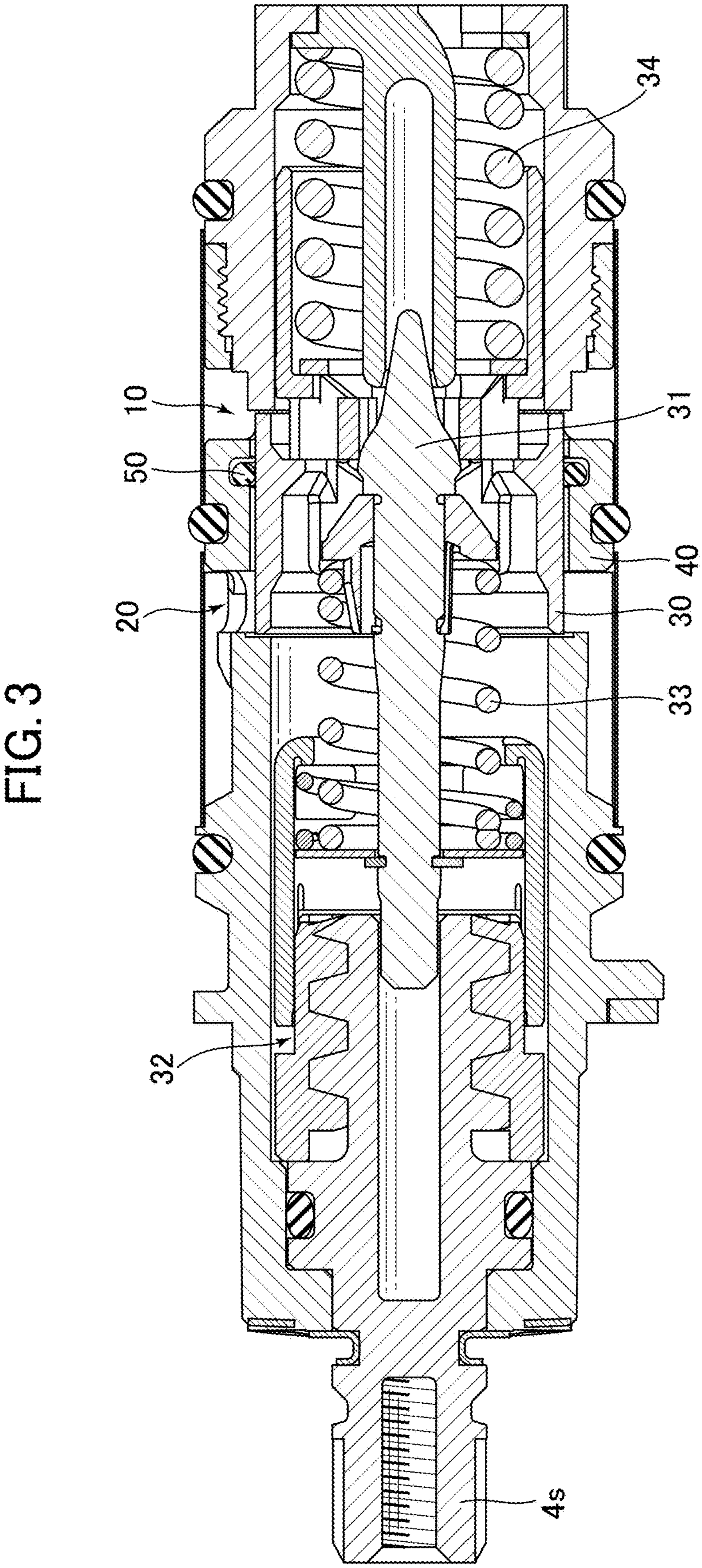
FIG. 3 is an enlarged view showing a main part of FIG. 2.
Figure 4:
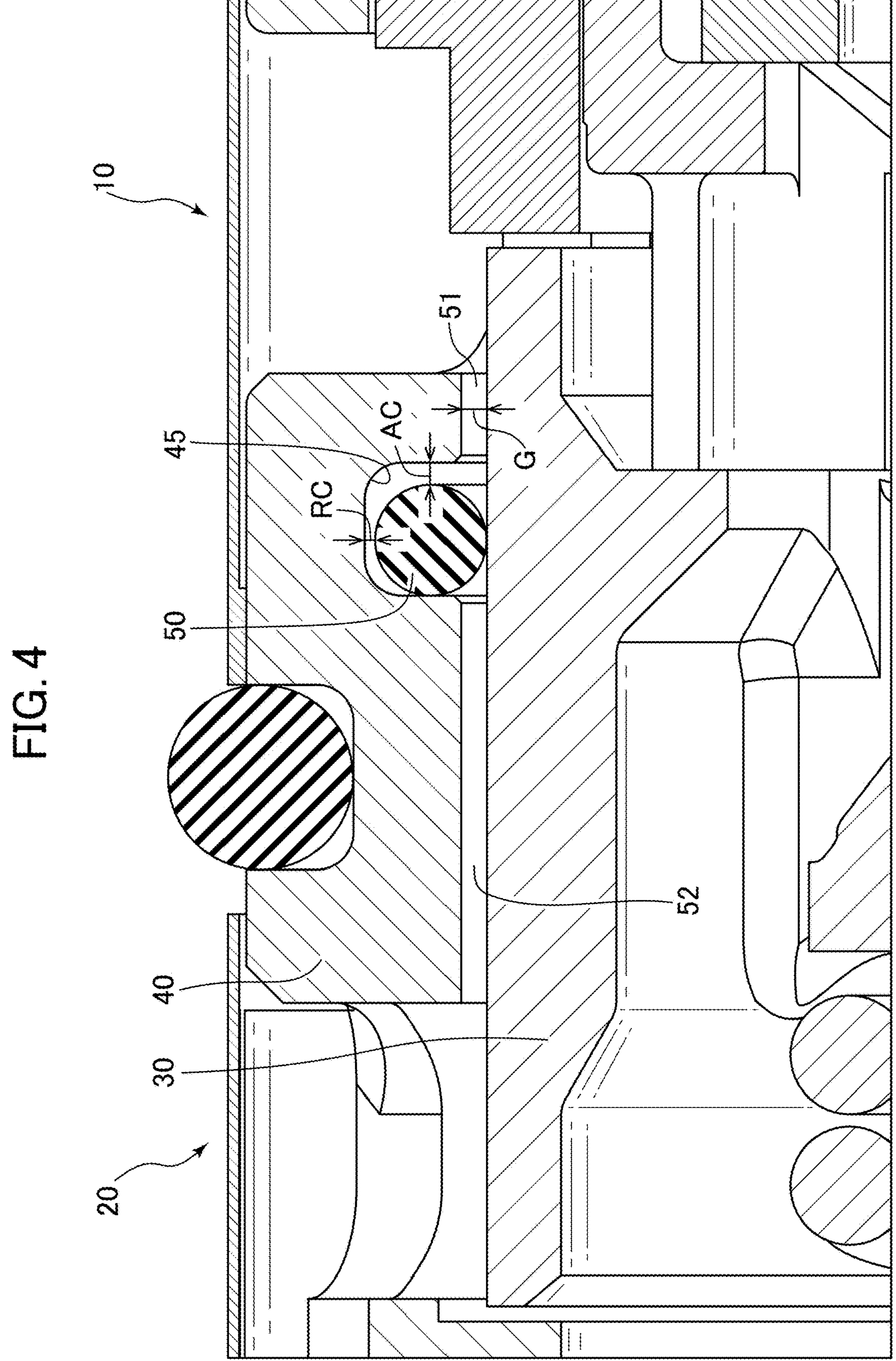
FIG. 4 is an enlarged view showing a vicinity of an O-ring of FIG. 3.
Figure 5:
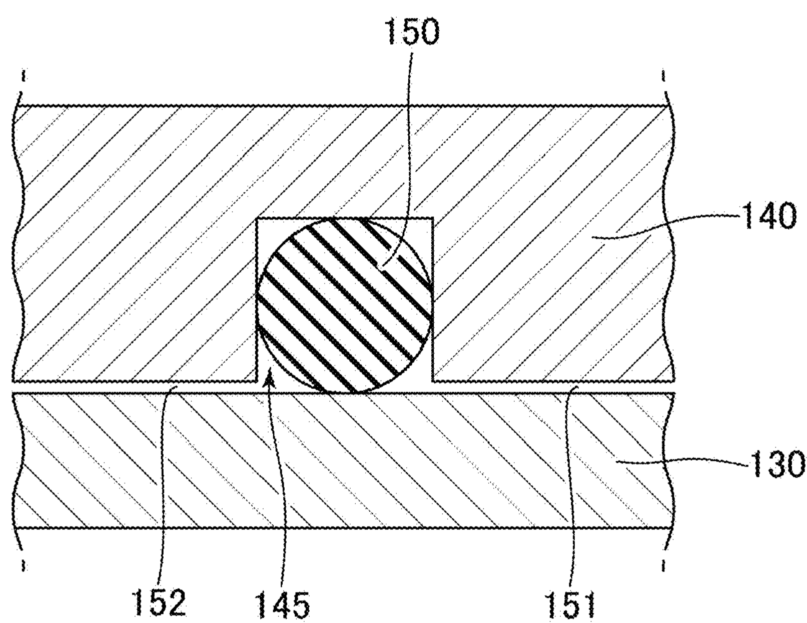
FIG. 5 is a schematic view showing a vicinity of a conventional O-ring.
Figure 6:
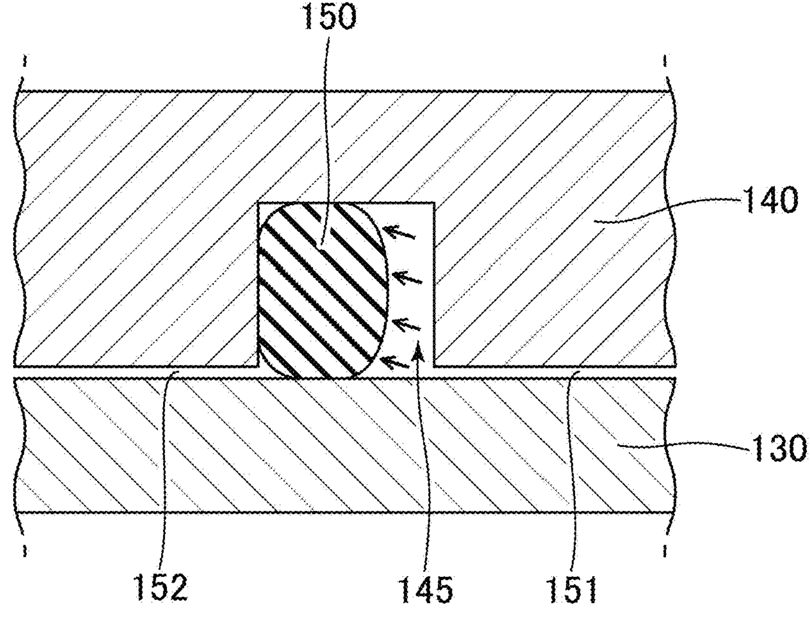
FIG. 6 is a schematic view showing the conventional O-ring under a state in which the conventional O-ring is subjected to a differential pressure.

FIG. 2 is a sectional view showing the hot water and cold water mixing apparatus 100 of FIG. 1. FIG. 3 is an enlarged view showing a main part of FIG. 2. FIG. 4 is an enlarged view showing a vicinity of an O-ring of FIG. 3.

As shown in FIGS. 2 to 4, the hot water and cold water mixing apparatus 100 is provided with a cold water channel 10 into which cold water is supplied from the cold water tap 1 and a hot water channel 20 into which hot water is supplied from the hot water tap 2. A substantial cylindrical valve body 30 is arranged movably in an axial direction thereof.

The valve body 30 is connected and fixed to a central shaft 31. The central shaft 31 is supported by a rotation shaft 4_s_ of the temperature adjustment handle 4 via a threaded part 32. Thereby, when the temperature adjustment handle 4 (and thus the rotation shaft 4_s_) is rotated, a seating end surface of a stainless steel coil spring 33 moves in the axial direction, and thus the valve body 30 moves in the axial direction (in a left and right direction in FIGS. 2 and 3) due to a spring force of the stainless steel coil spring 33. By means of the above axial movement, in the valve body 30, an introduction amount of the cold water from the cold water channel 10 and an introduction amount of the hot water from the hot water channel 20 are changed so that a temperature adjustment is achieved as desired.

In order to stabilize the temperature adjustment, the central shaft 31 and the valve body 30 are biased from a left side thereof to a right side thereof by means of the stainless steel coil spring 33 and are also biased from the right side thereof to the left side thereof by means of a shape memory alloy (SMA) coil spring 34 (whose extension force becomes stronger at a higher temperature). Thereby, when the temperature of the water to be discharged becomes lower, the SMA coil spring 34 contracts more so that the valve body 30 moves to the right side and the introduction amount of the hot water from the hot water channel 20 is increased. On the contrary, when the temperature of the water to be discharged becomes higher, the SMA coil spring 34 extends more so that the valve body 30 moves to the left side and the introduction amount of the cold water from the cold water channel 10 is increased.

An outer side of the valve body 30 is covered by a valve case 40 (valve housing). In the present embodiment, a groove portion 45 for receiving an O-ring 50 (an example of an annular hot water and cold water partition member) is provided on an inner surface of the valve case 40. In another embodiment, alternatively or additionally, the groove portion 45 may be provided on an outer surface of the valve body 30. The O-ring 50 is received in the groove portion 45. The O-ring 50 is made of rubber or resin that is elastically deformable. The O-ring 50 is configured to divide a gap between the outer surface of the valve body 30 and the inner surface of the valve case 40 into a cold water gap 51 communicating with the cold water channel 10 and a hot water gap 52 communicating with the hot water channel 20.

Herein, the O-ring 50 is configured to come into close contact with a side wall of the groove portion 45 (either one side wall in the axial direction) and with the outer surface of the valve body 30 (an example of only one of the outer surface of the valve body and the inner surface of the valve case) under a state in which there is a differential pressure between the cold water gap 51 and the hot water gap 52, so that communication between the cold water gap 51 and the hot water gap 52 is shut off.

In addition, the O-ring 50 is configured not to come into close contact with an inner surface of the groove portion 45 of the valve case 40 (a surface facing inward) (an example of the other of the outer surface of the valve body and the inner surface of the valve case) under the state in which there is a differential pressure between the cold water gap 51 and the hot water gap 52. Thereby, a sliding resistance when the valve body 30 is slid against the valve case 40 can be reduced.

In the present embodiment, the O-ring 50 is configured to be kept away from the inner surface of the groove portion 45 of the valve case 40 (the surface facing inward) under the state in which there is a differential pressure between the cold water gap 51 and the hot water gap 52.

Examples of specific dimensions are described below. The groove portion 45 has an axial direction clearance AC in the axial direction under an open atmospheric state in which the O-ring 50 is received therein and a shutoff valve is closed (under a state in which there is no differential pressure between the cold water gap 51 and the hot water gap 52 and thus the O-ring 50 is not deformed). For example, the axial direction clearance AC is within a range of 0.2 mm to 1 mm and is smaller than a moving stroke of the valve body 30 based on the rotation of the temperature adjustment handle 4. For example, the moving stroke of the valve body 30 is within a range of 0.5 mm to 2 mm. The axial direction clearance AC is also smaller than a radial direction gap G between the outer surface of the valve body 30 and the inner surface of the valve case 40 on an outside of the groove portion 45 (in an area in which the groove portion 45 does not exist). For example, the radial direction gap G is within a range of 0.3 mm to 1.5 mm. Furthermore, the radial direction gap G is smaller than the moving stroke of the valve body 30.

Furthermore, the groove portion 45 has a radial direction clearance RC in a direction perpendicular to the axial direction under the open atmospheric state in which the O-ring 50 is received therein and the shutoff valve is closed (under the state in which there is no differential pressure between the cold water gap 51 and the hot water gap 52 and thus the O-ring 50 is not deformed). For example, the radial direction clearance RC is within a range of 0 mm to 0.5 mm and is smaller than the axial direction clearance AC.

With respect to the size of the O-ring 50, for example, an outer diameter thereof may be within a range of 10 mm to 50 mm, an inner diameter thereof may be within a range of 9 mm to 49 mm, and a height thereof may be within a range of 1 to 3 mm.

In addition, the hot water and cold water mixing apparatus 100 of the present embodiment is configured in such a manner that an amount of the cold water which can pass through the cold water gap 51 is smaller than an amount of the cold water which flows into the valve body 30 from the cold water channel 10 and that an amount of the hot water which can pass through the hot water gap 52 is smaller than an amount of the hot water which flows into the valve body 30 from the hot water channel 20.

(Operations and Effects)

According to the hot water and cold water mixing apparatus 100 of the present embodiment as described above, the O-ring 50 comes into close contact with the side wall of the groove portion 45 and with the outer surface of the valve body 30 under the state in which there is a differential pressure between the cold water gap 51 and the hot water gap 52. Thereby, the performance capable of shutting off the communication between the cold water gap 51 and the hot water gap 52 is maintained. On the other hand, the O-ring 50 does not come into close contact with the inner surface of the groove portion 45 of the valve case 40 (the surface facing inward). Thereby, the sliding resistance when the valve body 30 is slid against the valve case 40 can be reduced.

In addition, according to the hot water and cold water mixing apparatus 100 of the present embodiment, the O-ring 50 is kept away from the inner surface of the groove portion 45 of the valve case 40 under the state in which there is a differential pressure between the cold water gap 51 and the hot water gap 52. Thereby, the sliding resistance when the valve body 30 is slid against the valve case 40 can be reduced more clearly and more surely.

In addition, according to the hot water and cold water mixing apparatus 100 of the present embodiment, the groove portion 45 is provided only on the inner surface of the valve case 40 and not on the outer surface of the valve body 30. This manner in which the groove portion 45 is provided on just one of the outer surface of the valve body 30 and the inner surface of the valve case 40 can save the cost of forming the groove portion 45 and can improve the assembling performance because it does not require alignment of groove portions as another manner in which groove portions are provided on both of them.

In particular, according to the inventors' findings, when the groove portion 45 is provided only on the inner surface of the valve case 40, the O-ring 50 is fitted in a state extended from an original diameter thereof and thus comes into close contact with the outer surface of the valve body 30 due to an elastic force of its own. This achieves good performance of shutting off the communication. On the contrary, when the O-ring 50 comes into close contact with the inner surface of the valve case 40, it must be inserted in a state contracted from the original diameter thereof. In this way, the O-ring 50 is likely to contract in a distorted manner, and thus is not likely to come into close contact fully circumferentially, which means lower performance of shutting off the communication.

In addition, according to the hot water and cold water mixing apparatus 100 of the present embodiment, the groove portion 45 has the axial direction clearance AC in the axial direction under the open atmospheric state in which the O-ring 50 is received therein and the shutoff valve is closed (under the state in which there is no differential pressure between the cold water gap 51 and the hot water gap 52 and thus the O-ring 50 is not deformed), and the axial direction clearance AC is smaller than the moving stroke of the valve body 30. According to the axial direction clearance AC having this feature, the O-ring 50 can be subjected to a differential pressure sufficiently rapidly so that the performance of shutting off the communication can be served effectively.

In addition, according to the hot water and cold water mixing apparatus 100 of the present embodiment, the groove portion 45 has the radial direction clearance RC in the direction perpendicular to the axial direction under the open atmospheric state in which the O-ring 50 is received therein and the shutoff valve is closed (under the state in which there is no differential pressure between the cold water gap 51 and the hot water gap 52 and thus the O-ring 50 is not deformed), and the radial direction clearance RC is smaller than the axial direction clearance AC. According to the radial direction clearance RC having this feature as well, the O-ring 50 can be subjected to a differential pressure sufficiently rapidly so that the performance of shutting off the communication can be served effectively.

In addition, according to the hot water and cold water mixing apparatus 100 of the present embodiment, the axial direction clearance AC is smaller than the radial direction gap G between the outer surface of the valve body 30 and the inner surface of the valve case 40 on the outside of the groove portion 45. According to the axial direction clearance AC having this feature as well, the O-ring 50 can be subjected to a differential pressure sufficiently rapidly so that the performance of shutting off the communication can be served effectively.

In addition, according to the hot water and cold water mixing apparatus 100 of the present embodiment, the radial direction gap G is smaller than the moving stroke of the valve body 30, the amount of the cold water which can pass through the cold water gap 51 is smaller than the amount of the cold water which flows into the valve body 30 from the cold water channel 10, and the amount of the hot water which can pass through the hot water gap 52 is smaller than the amount of the hot water which flows into the valve body 30 from the hot water channel 20. According to these features, even if the performance of shutting off the communication by means of O-ring 50 is lost due to any reason, the degree to which the temperature adjustment function is obstructed by the cold water which passes through the cold water gap 51 and/or by the hot water which passes through the hot water gap 52 is reduced.

What is claimed is:

1. A hot water and cold water mixing apparatus comprising:

- a cold water channel into which cold water is supplied from a cold water supply source,
- a hot water channel into which hot water is supplied from a hot water supply source,
- a tubular valve body arranged movably in an axial direction thereof, the valve body being configured to adjust an introduction amount of the cold water from the cold water channel and an introduction amount of the hot water from the hot water channel by moving in the axial direction thereof,
- a valve case covering an outer side of the valve body, and
- an annular hot water and cold water partition member arranged between an outer surface of the valve body and an inner surface of the valve case, the annular hot water and cold water partition member being configured to divide a gap therebetween into a cold water gap communicating with the cold water channel and a hot water gap communicating with the hot water channel, wherein a groove portion for receiving the annular hot water and cold water partition member is provided on the inner surface of the valve case, the groove portion has at least one pair of side walls, the annular hot water and cold water partition member is configured to come into close contact with one side wall on a hot-water-gap side of the at least one pair of side walls of the groove portion and with only one of the outer surface of the valve body so that communication between the cold water gap and the hot water gap is shut off and not to come into close contact with a surface facing the valve body of the inner surface of the valve case, under a state in which there is a differential pressure between the cold water gap and the hot water gap in a direction from the cold water gap toward the hot water gap, and the annular hot water and cold water partition member is configured to come into close contact with one side wall on a cold-water-gap side of the at least one pair of side walls of the groove portion and with only the outer surface of the valve body so that communication between the cold water gap and the hot water gap is shut off and not to come into close contact with a surface facing the valve body of the inner surface of the valve case, under a state in which there is a differential pressure between the cold water gap and the hot water gap in a direction from the hot water gap toward the cold water gap.

2. The hot water and cold water mixing apparatus according to claim 1, wherein the annular hot water and cold water partition member is configured to be away from the inner surface of the valve case, under the state in which there is a differential pressure between the cold water gap and the hot water gap.

3. The hot water and cold water mixing apparatus according to claim 1, wherein the groove portion has an axial direction clearance in the axial direction under an open atmospheric state in which the annular hot water and cold water partition member is received therein and a shutoff valve is closed, and the axial direction clearance is smaller than a moving stroke of the valve body.

4. The hot water and cold water mixing apparatus according to claim 3, wherein the groove portion has a radial direction clearance in a direction perpendicular to the axial direction under the open atmospheric state in which the annular hot water and cold water partition member is received therein and the shutoff valve is closed, and the radial direction clearance is smaller than the axial direction clearance.

5. The hot water and cold water mixing apparatus according to claim 4, wherein the axial direction clearance is smaller than a radial direction gap between the outer surface of the valve body and the inner surface of the valve case on an outside of the groove portion.

6. The hot water and cold water mixing apparatus according to claim 5, wherein the radial direction gap is smaller than the moving stroke of the valve body.

* * * * *